(12) United States Patent
Barden et al.

(10) Patent No.: US 10,317,014 B2
(45) Date of Patent: Jun. 11, 2019

(54) FLOW VARIATION SYSTEM

(71) Applicant: BAKER HUGHES, A GE COMPANY, LLC, Houston, TX (US)

(72) Inventors: Andrew J. Barden, Bellaire, TX (US); Luis Russo, Houston, TX (US); Peter Dixon, Peebles (GB); Alastair Goodall, Bonnyrigg (GB)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 129 days.

(21) Appl. No.: 15/275,411

(22) Filed: Sep. 25, 2016

(65) Prior Publication Data

US 2018/0045355 A1 Feb. 15, 2018

Related U.S. Application Data

(60) Provisional application No. 62/372,476, filed on Aug. 9, 2016.

(51) Int. Cl.
*F17D 5/00* (2006.01)
*F17D 5/06* (2006.01)
(Continued)

(52) U.S. Cl.
CPC .............. *F17D 5/00* (2013.01); *B08B 9/0325* (2013.01); *B08B 9/055* (2013.01); *F16L 55/07* (2013.01);
(Continued)

(58) Field of Classification Search
CPC ........ B08B 9/0325; B08B 9/055; F16L 55/07; F16L 55/10; F16L 55/26; F16L 55/46;
(Continued)

(56) References Cited

U.S. PATENT DOCUMENTS 5,404,104 A * 4/1995 Rivola ................... F16L 58/00
205/776.5
5,883,303 A * 3/1999 Bliss ..................... G01M 3/022
138/89

(Continued)

FOREIGN PATENT DOCUMENTS

AU 39331/97 A 4/1999
EP 1401702 B1 4/2007
(Continued)

OTHER PUBLICATIONS

"Subsea Pigging and Hydrostatic Testing Services", Halliburton, 2010, 2pp.
(Continued)

*Primary Examiner* — William M McCalister
(74) *Attorney, Agent, or Firm* — Shawn Hunter (57) ABSTRACT

Methods of remotely, selectively controlling the flow rate of fluid moving through a subsea pipeline during dewatering of the pipeline involve a control unit of a subsea valve actuation system selectively, autonomously varying the flow of fluid through a fluid flow conduit of the system fluidly coupled to the pipeline at the pig receiving end thereof based at least partially upon one or more signals emitted by at least one pressure transducer or flow meter fluidly coupled to the fluid flow conduit.

10 Claims, 6 Drawing Sheets

(51) Int. Cl.
| | |
|---|---|
| *F16L 55/07* | (2006.01) |
| *F16L 55/10* | (2006.01) |
| *F16L 55/26* | (2006.01) |
| *F16L 55/46* | (2006.01) |
| *F17D 3/08* | (2006.01) |
| *G01M 3/02* | (2006.01) |
| *G01M 3/28* | (2006.01) |
| *B08B 9/032* | (2006.01) |
| *B08B 9/055* | (2006.01) |

(52) U.S. Cl.
CPC ............... *F16L 55/10* (2013.01); *F16L 55/26* (2013.01); *F16L 55/46* (2013.01); *F17D 3/08* (2013.01); *F17D 5/005* (2013.01); *F17D 5/06* (2013.01); *G01M 3/022* (2013.01); *G01M 3/2807* (2013.01); *G01M 3/2823* (2013.01)

(58) Field of Classification Search
CPC ... F17D 3/08; F17D 5/00; F17D 5/005; F17D 5/06; G01M 3/022; G01M 3/2807; G01M 3/2823
USPC .................................................. 73/49.1, 49.5
See application file for complete search history.

(56) References Cited

U.S. PATENT DOCUMENTS

| | | | |
|---|---|---|---|
| 5,927,901 A | 7/1999 | Graves | |
| 6,022,421 A | 2/2000 | Bath et al. | |
| 6,082,182 A | 7/2000 | Fierro et al. | |
| 6,539,778 B2* | 4/2003 | Tucker | F16L 1/26 73/49.5 |
| 6,840,088 B2 | 1/2005 | Tucker et al. | |
| 7,011,152 B2 | 3/2006 | Soelvik | |
| 7,281,880 B2 | 10/2007 | Tucker et al. | |
| 7,708,839 B2* | 5/2010 | Yemington | F16L 55/46 134/22.11 |
| RE42,358 E* | 5/2011 | Tucker | F16L 1/26 73/49.5 |
| 8,240,191 B2 | 8/2012 | Loeb et al. | |
| 8,240,952 B2 | 8/2012 | Loeb et al. | |
| 8,240,953 B2 | 8/2012 | Loeb | |
| 8,312,584 B2 | 11/2012 | Hodde | |
| 8,381,578 B2 | 2/2013 | Sweeney | |
| 8,430,168 B2 | 4/2013 | Goodall et al. | |
| 8,491,722 B2* | 7/2013 | Phipps | F16L 55/38 134/21 |
| 8,731,849 B2 | 5/2014 | Westra et al. | |
| 8,746,042 B2 | 6/2014 | Sweeney | |
| 8,770,892 B2 | 7/2014 | Sweeney et al. | |
| 8,925,636 B2 | 1/2015 | Cumming et al. | |
| 2003/0010094 A1* | 1/2003 | Tucker | F16L 1/26 73/49.5 |
| 2005/0252278 A1 | 11/2005 | Bryant et al. | |
| 2006/0115332 A1* | 6/2006 | Abney | F16L 55/26 405/169 |
| 2008/0282776 A1 | 11/2008 | Loeb et al. | |
| 2008/0282777 A1 | 11/2008 | Loeb | |
| 2009/0288836 A1 | 11/2009 | Goodall et al. | |
| 2010/0085064 A1 | 4/2010 | Loeb et al. | |
| 2010/0089126 A1* | 4/2010 | Sweeney | B63C 11/42 73/40 |
| 2010/0119382 A1 | 5/2010 | Scarsdale | |
| 2010/0139544 A1 | 6/2010 | Bo | |
| 2011/0139538 A1* | 6/2011 | Hill | F17D 5/06 181/123 |
| 2011/0178736 A1* | 7/2011 | Westra | F17D 5/02 702/50 |
| 2012/0079880 A1 | 4/2012 | Freitag | |
| 2012/0107051 A1* | 5/2012 | Sweeney | B08B 9/055 405/184.1 |
| 2012/0215348 A1* | 8/2012 | Skrinde | B08B 9/049 700/245 |
| 2013/0276828 A1* | 10/2013 | Phipps | B08B 9/0551 134/8 |
| 2014/0020594 A1* | 1/2014 | Early | F16L 55/265 105/26.05 |
| 2014/0067268 A1 | 3/2014 | Tunheim et al. | |
| 2015/0143920 A1* | 5/2015 | Mackenzie | G01B 13/10 73/861.52 |

FOREIGN PATENT DOCUMENTS

| | | |
|---|---|---|
| GB | 2303895 B | 3/1997 |
| GB | 2390435 A | 5/2002 |
| WO | 02/088658 A2 | 11/2002 |
| WO | 03/002403 A1 | 1/2003 |

OTHER PUBLICATIONS

"Deepwater Precommissioning Services", Weatherford, 2008-2010, 8pp.
"Remote Deepwater Developments", World Pipelines, vol. 7, No. 12, Dec. 2007, 6pp.
"SHP (Subsea Hydrotest Pump) Skid", BJ Process and Pipeline Services, Apr. 18, 2007, 1pp.
"RFM (Remote Flooding Module)", BJ Process and Pipeline Services, Apr. 18, 2007, 1pp.
"RFM Boost Pump Skid", BJ Process and Pipeline Services, Apr. 18, 2007, 1pp.
"Precommissioning—Subsea Flooding and Testing", BJ Services Company, 2011, 1pp.
"Pigging, Flooding and Testing (PFT) Valve for Subsea Pipelines," Crown-American, Inc., 2 pp.
"Baker Hughes Smart Gauge Tool (SGT)", Baker Hughes Incorporated 2011, 2 pp.
"OnlinE 600 Series Acoustic Pingers", Online Electronics Ltd., RevA03 IM May 22, 2014, 2 pp.
"OnlinE 2400 ROV Acoustic Receiver", Online Electronics Ltd., RevA08 BG Apr. 7, 2015, 2 pp.
"OnlinE 2402 Acoustic Subsea Receiver", Online Electronics Ltd., RevA05 BG May 28, 2014, 2 pp.
"OnlinE 2001 System Datasheet", Online Electronics Ltd., RevA03 EI Feb. 17, 2014, 2 pp.

* cited by examiner

FLOW VARIATION SYSTEM

This application claims priority to U.S. Provisional Patent Application Ser. No. 62/372,476 filed on Aug. 9, 2016 and entitled "Automated System and Methods for Performing One or More Functions at the Pig Receiving End of a Subsea Pipeline", which is hereby incorporated by reference herein in its entirety.

FIELD OF THE INVENTION

The present disclosure relates generally to an automated system and methods for performing one or more functions at the pig receiving end of a subsea pipeline.

BACKGROUND OF THE INVENTION

In subsea pipeline operations, various activities are initiated at one end (the "launch end") of the pipeline, such as launching pigs for flooding or dewatering the pipeline, conducting hydrotesting of the pipeline or other activities. Often, it is necessary or would be desirable to perform certain actions at the other end of the pipeline, which is sometimes referred to as the "distant end", "pig receiving end" or simply the "receiving end" of the pipeline. For example, it may be desirable or necessary to open or close fluid exhaust valves at the receiving end during various pipeline pre-commissioning or other operations. For instance, to facilitate the transition between flooding and hydrotesting of the pipeline, it is typically necessary to close off one or more fluid exhaust valves at the receiving end. For another example, after hydrotesting, if it is desired to dewater the pipeline from the launch end, it may be necessary to open the fluid exhaust valve(s) at the receiving end. For still a further example, it is often desirable or necessary to sample, test and/or monitor fluids exiting the pipeline, such as during dewatering.

Existing systems and techniques used in connection with various subsea pipeline operations conducted at the receiving end of the pipeline are believed to have one or more limitations. For example, existing systems and techniques to open and/or close fluid exhaust valves at the receiving end of the subsea pipeline are believed to require the deployment of a remotely operated vehicle (ROV) or the like. This requirement for an ROV or similar equipment is significant because of the time and expense involved and the diversion of resources from another location. For another example, existing systems and techniques either cannot perform various functions at the receiving end or would require external power and/or control (e.g. from an ROV, diver, surface vessel, etc.), such as for varying the flow rate and/or pressure of fluid flowing through the pipeline, measuring, logging and/or communicating pipeline fluid data (e.g. pressure, flow rates, temperature, etc.), pipeline fluid sampling/testing/monitoring data, pipeline condition data, leak detection data and the like.

It should be understood that the above discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited examples, features and/or disadvantages, merely because of their mention herein.

Accordingly, there exists a need for improved systems, apparatus and methods useful to assist in performing one or more activities at the receiving end of a pipeline having one or more of the features, attributes or capabilities described or shown in, or as may be apparent from, the other portions of this patent application.

BRIEF SUMMARY OF THE DISCLOSURE

In some embodiments, the present disclosure involves methods of remotely, selectively controlling the pressure and/or flow rate of fluid moving through a subsea pipeline during dewatering of the pipeline without the involvement of an external source at the surface, or a UV, at the pig receiving end of the pipeline. These methods include fluidly coupling a fluid flow conduit of an automated, self-powered, self-controlled subsea valve actuation system to the pipeline at the pig receiving end thereof. The fluid flow conduit includes multiple branches all in fluid communication with the pipeline and the sea. Each branch may be selectively opened and closed by actuating at least one flow isolation valve associated therewith without the involvement of an external source at the surface, or a UV, at the pig receiving end of the pipeline to change the flow rate and/or pressure of fluid flowing through the pipeline during dewatering. Fluid is allowed to exit the pipeline to the sea through at least one fluid flow conduit branch during dewatering. At least one pressure transducer fluidly coupled to the fluid flow conduit measures the fluid pressure in the fluid flow conduit during dewatering and emits at least one signal relating to the fluid pressure in the fluid flow conduit. Based at least partially upon one or more signals emitted by at least one of the pressure transducers and without the involvement of an external source at the surface, or a UV, at the pig receiving end of the pipeline, a control unit of the subsea valve actuation system selectively, autonomously actuates at least one flow isolation valve associated with at least one of the fluid flow conduit branches to open or close off fluid flow therethrough to change the flow rate and/or pressure of fluid flowing through the pipeline during dewatering of the pipeline.

In various embodiments, methods of remotely, selectively controlling the flow rate of fluid moving through a subsea pipeline during dewatering of the pipeline without the involvement of an external source at the surface, or a UV, at the pig receiving end of the pipeline include fluidly coupling a fluid flow conduit of an automated, self-powered, self-controlled subsea valve actuation system to the pipeline at the pig receiving end thereof. The fluid flow conduit includes multiple branches all in fluid communication with the pipeline and the sea. Each branch may be selectively opened and closed by actuating at least one flow isolation valve associated therewith without the involvement of an external source at the surface, or a UV, at the pig receiving end of the pipeline to change the flow rate of fluid flowing through the pipeline during dewatering. Fluid is allowed to exit the pipeline to the sea through at least one fluid flow conduit branch during dewatering. At least one flow meter fluidly coupled to the fluid flow conduit measures the fluid flow rate in the fluid flow conduit during dewatering and emits at least one signal relating to the fluid flow rate in the fluid flow conduit. Based at least partially upon one or more signals emitted by at least one of the flow meters and without the involvement of an external source at the surface, or a UV, at the pig receiving end of the pipeline, a control unit of the subsea valve actuation system selectively, autonomously actuates at least one flow isolation valve associated with at least one of the fluid flow conduit branches to open or close off fluid flow therethrough to change the flow rate of fluid flowing through the pipeline during dewatering of the pipeline.

The present disclosure also includes embodiments of methods of remotely, selectively controlling the pressure and/or flow rate of fluid moving through a subsea pipeline during dewatering of the pipeline without the involvement of an external source at the surface, or a UV, at the pig receiving end of the pipeline. These methods include fluidly coupling a fluid flow conduit of an automated, self-powered, self-controlled subsea valve actuation system to the pipeline at the pig receiving end thereof. At least one variable control valve fluidly coupled to the fluid flow conduit allows fluid to exit the pipeline to the sea during dewatering. At least one pressure transducer fluidly coupled to the fluid flow conduit measures the fluid pressure in the fluid flow conduit during dewatering and emits at least one signal relating to the fluid pressure in the fluid flow conduit. Based at least partially upon one or more signals emitted by at least one of the pressure transducers and without the involvement of an external source at the surface, or a UV, at the pig receiving end of the pipeline, a control unit of the subsea valve actuation system selectively, autonomously actuates the at least one variable control valve to change the flow rate and/or pressure of fluid flowing through the pipeline during dewatering of the pipeline.

There are also embodiments of the present disclosure that involve methods of remotely, selectively controlling the flow rate of fluid moving through a subsea pipeline during dewatering of the pipeline without the involvement of an external source at the surface, or a UV, at the pig receiving end of the pipeline. A fluid flow conduit of an automated, self-powered, self-controlled subsea valve actuation system is fluidly coupled to the pipeline at the pig receiving end thereof. At least one variable control valve fluidly coupled to the fluid flow conduit allows fluid to exit the pipeline to the sea during dewatering of the pipeline. At least one flow meter fluidly coupled to the fluid flow conduit measures the fluid flow rate in the fluid flow conduit during dewatering of the pipeline and emits at least one signal relating to the fluid flow rate in the fluid flow conduit. Based at least partially upon one or more signals emitted by at least one of the flow meters and without the involvement of an external source at the surface, or a UV, at the pig receiving end of the pipeline, a control unit of the subsea valve actuation system selectively, autonomously actuates at least one variable control valve to change the flow rate of fluid flowing through the pipeline during dewatering of the pipeline.

Accordingly, the present disclosure includes features and advantages which are believed to enable it to advance remote subsea pipeline operations. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein.

DETAILED DESCRIPTION OF PREFERRED EMBODIMENTS

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

In showing and describing preferred embodiments in the appended figures, common or similar elements are referenced with like or identical reference numerals or are apparent from the figures and/or the description herein. When multiple figures refer to a component or feature with the same reference numeral, any description herein of the component or feature with respect to any of the figures applies equally to the other figures to the extent such description does not conflict with a description herein of the other figure(s). The embodiments shown in the figures are illustrated for simplicity and clarity and have not necessarily been drawn to scale. Also, common but well-understood components useful or necessary in the illustrated embodiments are often not depicted in order to facilitate a less obstructed view of other depicted features. Certain features and certain views of the figures may be shown exaggerated in scale or in schematic in the interest of clarity and conciseness.

As used herein and throughout various portions (and headings) of this patent application, the terms "invention", "present invention" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference. The terms "coupled", "connected", "engaged" and the like, and variations thereof, as used herein and in the appended claims are intended to mean either an indirect or direct connection or engagement. Thus, if a first device couples to a second device, that connection may be through a direct connection, or through an indirect connection via other devices and connections.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

Figure 1:
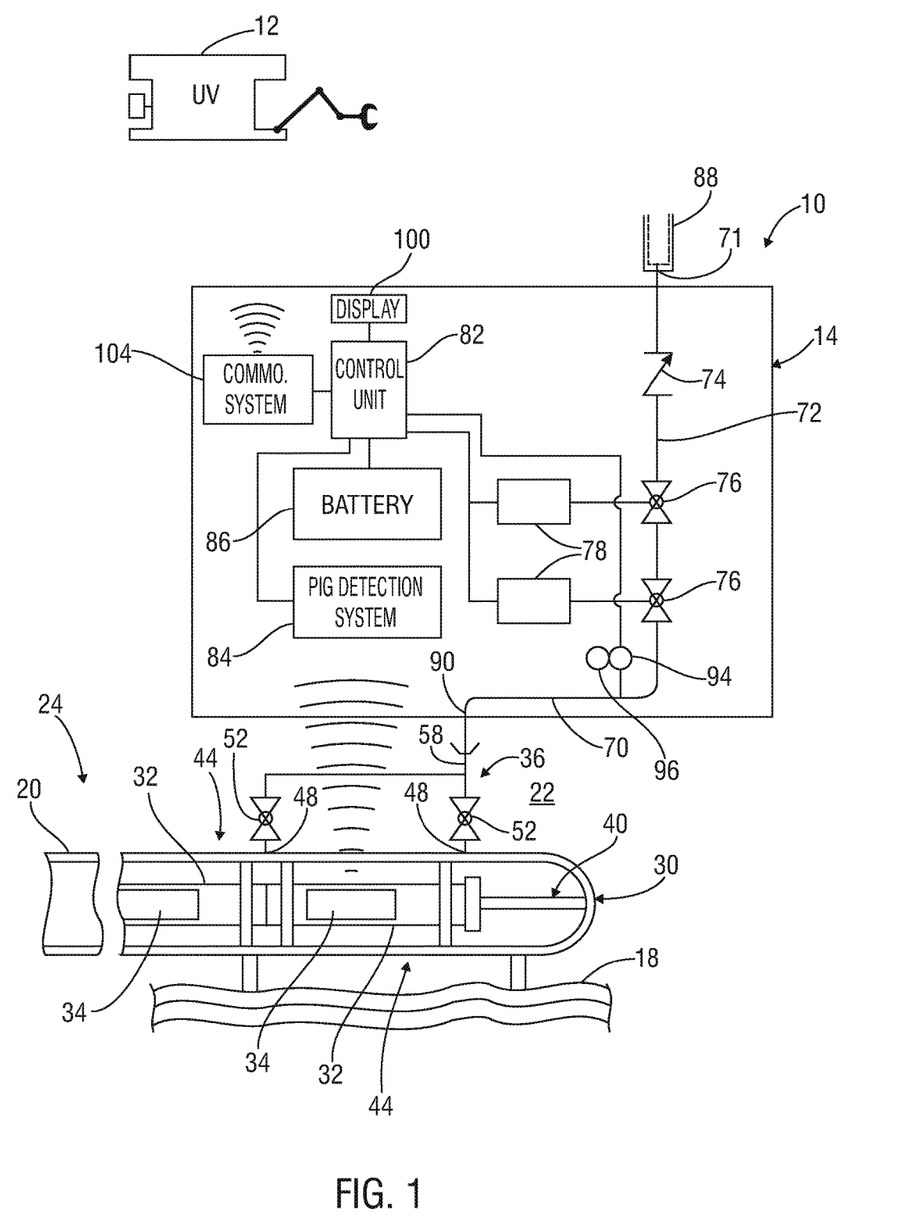
FIG. 1 is a diagrammatic view of an exemplary automated subsea valve actuation system shown engaged with a pipeline on the sea floor in accordance with an embodiment of the present disclosure.

The reference numerals used herein and in the appended drawings and their associated exemplary components or features are as follows:

- 10 automated subsea valve actuation system
- 12 Underwater Vehicle (UV)
- 14 skid frame
- 18 sea floor
- 20 subsea pipeline
- 24 (pig) receiving end
- 30 pig receiver
- 32 pig
- 34 pig signaler
- 36 pig receiver manifold
- 40 pig stop
- 44 pig docking station
- 48 fluid exit port
- 52 pig receiver discharge valve
- 58 fluid exhaust conduit
- 70 fluid flow conduit
- 71 exit port
- 72 fluid flow conduit branch
- 72a first fluid flow conduit branch
- 72b second fluid flow conduit branch
- 74 check valve
- 76 flow isolation valve
- 76a-e flow isolation valves
- 78 valve actuator/power assembly
- 82 control unit
- 84 pig detection system
- 86 battery
- 88 diffuser
- 90 jumper
- 94 pressure transducer
- 96 temperature transducer
- 100 display
- 104 data communication system
- 108 flow meter
- 110 flow restrictor
- 112 orifice plate
- 116 variable control valve
- 120 fluid sampling and/or monitoring system
- 124 input end
- 128 discharge end
- 130 flow conduit
- 132 flow conduit branch
- 132a first flow conduit branch
- 132b second flow conduit branch
- 136 fluid analyzer
- 140 densitometer
- 150 fluid sampling bottle
- 150a first fluid sampling bottle
- 150b second fluid sampling bottle Referring initially to FIG. 1, an embodiment of an automated subsea valve actuation system 10 useful for selectively autonomously allowing and disallowing the flow of fluid out of a subsea pipeline 20 at the pig receiving end 24 thereof and/or performing one or more other remote operations at the receiving end 24 is shown. As used herein and in the appended claims, the terms "autonomous" and variations thereof means without the involvement of an underwater vehicle (UV) or external source at the surface of the body of water (e.g. vessel, platform, etc.) for performing or controlling the referenced activity or process. As used herein and in the appended claims, the terms "underwater vehicle" (UV) and variations thereof means and includes at least one diver, remotely operated vehicle (ROV), autonomous underwater vehicle (AUV), any other unmanned or manned vehicle, such as a mini-submarine, and other equipment and related techniques for accessing a subsea pipeline and related equipment, as are and become further known. The exemplary pipeline 20 is shown at the sea floor 18 (below a body of water). The illustrated automated subsea valve actuation system 10 is shown fluidly coupled to the receiving end 24 of the pipeline 20.

In the illustrated example, the subsea pipeline 20 is shown having a pig receiver 30 and a pig receiver manifold 36 at its receiving end 24. The illustrated pig receiver 30 is shown having a pig stop 40 at its farthest end and at least two pig docking areas, or stations, 44 proximate thereto. Two exemplary pigs 32 are shown docked within the pig receiver 30. However, there may be only one pig docking station 44 and pig 32, or more than two of each. For the reader's convenience, the term "pig" as used herein in the singular tense pig means one or multiple pigs. Multiple pigs 32 may also be referred to herein as a "pig train". A distinct fluid exit port 48 and pig receiver discharge valve 52 are shown associated with the exemplary pig receiver 30 proximate to each respective pig docking station 44. The illustrated exit ports 48 and pig receiver discharge valves 52 are shown fluidly connected to a common fluid exhaust conduit 58. In this example, the pig receiver discharge valves 52 and fluid exhaust conduit 58 are part of the illustrated pig receiver manifold 36.

It should be noted, however, that the pipeline 20 may have additional or different components as those described above or shown in the appended drawings. Further, the present disclosure and appended claims are in no way limited to, or by, the pipeline components described above or shown in the appended drawings, except and only to the extent as may be explicitly recited in one or more of the appended claims and only for those claims and any claims depending therefrom.

In use of the illustrated pipeline 20 with prior art techniques, at any time after the pipeline 20 is deployed (e.g. onto the sea floor 18), each pig receiver discharge valve 52 would need to be actuated (e.g. powered and closed/opened) by an ROV, diver or other external power/control source (at the surface of the body of water or otherwise) to disallow and/or later allow fluid flow out of the pipeline 20 at the receiving end 24 thereof. For example, after flooding and before hydrotesting of the pipeline 20, each valve 52 would need to be closed by an ROV, diver or other external power/control source. For another example, after hydrotesting, each valve 52 would need to be opened by an ROV, diver or other external power/control source, such as to drain the pipeline 20 at its receiving end 24 or allow dewatering from the launch end of the pipeline 20.

For use of the exemplary automated subsea valve actuation system 10 of the present disclosure, the pig receiver discharge valves 52 may be effectively disabled (e.g. left open) and not used in conjunction with the use of the system 10.

In accordance with the present disclosure, the system 10 is useful to autonomously perform one or more desired actions at receiving end 24 of the pipeline 20. For example, the system 10 may be useful to autonomously, selectively allow or disallow fluid to exit the pipeline 20 at the receiving end 24 thereof during one or more pipeline pre-commissioning or other operations. For instance, to facilitate the transition between flooding and hydrotesting of the pipeline 20, the exemplary system 10 can be used to autonomously, selectively close off fluid flow out of the pipeline 20 at the receiving end 24. For another example, in some embodiments, such as shown in FIGS. 2-5, after the pipeline 20 is hydrotested, if it is desired to dewater the pipeline 20 from the launch end, the exemplary system 10 can be used to autonomously, selectively allow fluid to exit the pipeline 20 at the receiving end 24. For a further example, in various embodiments, such as shown in FIGS. 2-6, the exemplary system 10 can be used to autonomously, selectively sample, test and/or monitor fluids exiting the pipeline 20. For yet further examples, in many embodiments, the exemplary system 10 can be used to autonomously, selectively control or vary the flow rate of fluid exiting the pipeline 20, measure, log and/or communicate other data, such as pipeline fluid data (e.g. pressure, flow rates, temperature, etc.), pipeline fluid sampling/testing/monitoring data, pipeline condition data, leak detection data, system 10 component data, or a combination thereof.

The automated subsea valve actuation system 10 may include any desired type and arrangement of components suitable for autonomously, selectively allowing and disallowing the flow of fluid out of the pipeline 20 at the receiving end 24 thereof and/or performing one or more other remote functions at the receiving end 24. Referring again to FIG. 1, in this embodiment, the system 10 includes at least one fluid flow conduit 70, check valve 74, selectively operable flow isolation valve 76, control unit 82 and battery 86, all mounted or supported on a skid frame 14. However, the system 10 may include other or different components. Some examples of additional components that may be included in the system 10 are at least one pig detection system 84, pressure sensor or transducer 94 coupled to the conduit 70, temperature sensor or transducer 96 coupled to the conduit 70, flow meter 108 coupled to the conduit 70 (e.g., FIG. 2), data logger (not shown), display 100, data communication system 104 and/or fluid sampling/monitoring system 120 (e.g. FIG. 2).

The components of the system 10 may have any suitable form, configuration, construction and operation as is or become further known in the art. For example, the skid frame 14 may have any desired construction, configuration and operation suitable (i) to provide sufficient support for the various components of the system 10, such as during transport, deployment, operation, storage, maintenance and retrieval and (ii) to allow placement of the system 10 proximate to the receiving end 24 of the pipeline 20 to allow fluid coupling therebetween. Further, the various components of the system 10 may be positioned at any desired location and have any desired interconnection. Thus, the various components of the system 10 shown in the appended drawings are not limited to the illustrated configuration. For example, the pressure and temperature transducers 94, 96 and flow meter(s) 108 (e.g., FIG. 2), when included, are not limited to their illustrated locations, but may be located elsewhere on the skid frame 14, or even off the skid frame 14 in fluid communication with the conduit 70. Further, any desired number of each component (e.g. pressure and temperature transducers 94, 96 and flow meter(s) 108) may be included in the system 10.

Still referring to FIG. 1, the exemplary fluid flow conduit 70 is configured to be fluidly coupled to the pipeline 20 at one end and includes at least one flow exit port 71 in fluid communication with the exterior of the system 10 (e.g. the sea) at its other end. If desired, the fluid flow conduit 70 may have multiple (e.g. 2, 3, 4, etc.) fluidly connected branches 72 (e.g. FIG. 3) and multiple corresponding respective fluid exit ports 71 (e.g. FIG. 3). Also if desired, one or more diffusers 88 may be associated with the conduit 70 proximate to each exit port 71, as is or becomes further known in the art.

In the illustrated embodiment, each check valve 74 is fluidly coupled to the fluid flow conduit 70 and preconfigured to permit fluid flow out of the conduit 70 (and pipeline 20), while preventing any inflow of fluid from the sea into the pipeline 20. Each exemplary flow isolation valve 76 is also fluidly coupled to the conduit 70 and is selectively autonomously operable by the control unit 82 to allow or disallow fluid flow out of the pipeline 20 via the fluid flow conduit(s) 70.

Still referring to FIG. 1, the exemplary control unit 82 includes one or more computers and related hardware/software (e.g. PLC) configured to (i) receive, monitor and record data from one or more other components of the system 10 depending upon the configuration of the system 10 (e.g. flow rates, pressure, temperature, pig arrival data) and (ii) control operation of the flow isolation valves 76 in accordance with programmable logic. If desired, the control unit 82 may be programmed to control operation of other components in the system 10 (e.g. battery 86, data display 100, communication system 104), and/or components external to the system 10 or skid frame 14 (e.g. external associated batteries). Also if desired, the control unit 82 may be configured to receive, monitor and record any additional data, such as battery voltage data, conduit integrity data, electrical and power connection data, fluid sampling/monitoring data, etc. Thus, in the illustrated embodiment, the control unit 82 serves as a valve control unit and logging unit. In other embodiments, the control unit 82 may not perform both activities. For example, a separate logging unit may be included.

In some embodiments, the control unit 82 may be configured to transmit/receive data directly or through another component (e.g. the communication system 104) to/from one or more external sources such as, for example, a pipeline servicing, or flooding and/or hydrotesting, system (FHS), UV, surface vessel, fixed installation or other external data transmitter/receiver. For example, the control unit 82 may communicate with the automated subsea pipeline servicing system 10 disclosed in U.S. patent application Ser. No. 13/614,409 filed on Sep. 13, 2012 and entitled "Apparatus and Methods for Providing Fluid Into a Subsea Pipeline", the entire contents of which are hereby incorporated by reference herein. The subsea pipeline servicing system of patent application Ser. No. 13/614,409 is an example of a FHS. However, the FHS may be any suitable type of subsea or surface-based, or controlled, system that is connected to the launch end of the pipeline 20. For example, the FHS may be a system extending from a vessel or platform at the surface of the body of water.

Still referring to FIG. 1, the illustrated control unit 82 may obtain power from any suitable source, such as, for example, the battery 86 or another battery dedicated to the control unit 82 (e.g. via a voltage converter). It should be noted, the term "battery" and variations thereof as used herein means one or multiple batteries, such as a bank of batteries. If desired, the control unit 82 may also serve as a power unit to provide power to various components of the system 10. In this embodiment, for example, the control unit 82 supplies power to the pressure transducer 94, temperature transducer 96 and one or more valve actuator/power assemblies 78. If desired, the control unit 82 may provide power to any other components of the system 10, such as the pig detection system 84, display 100, communication system 104, fluid sampling/monitoring system 120 and flow meter 108 (e.g. FIG. 2), when included.

In some embodiments, the control unit 82 may include or be associated with a subsea data display 100, such as a digital display, to display any desired information readable by a UV 12 or other external source, such as the status of the system 10 before, during and/or after operations. It should be noted that, in some embodiments, the display 100 may be configured to display information from other sources other than or in addition to the control unit 82 (e.g. the communication system 104, pig detection system 84, pressure transducer 94, FHS, etc.).

Still referring to the embodiment of FIG. 1, the control unit 82 may be configured to communicate with one or more external sources through the communication system(s) 104. For example, in some configurations, data recorded by the control unit 82 or measured or recorded by another one or more components of the system 10 may be communicated to an external source (e.g. FHS, UV, surface vessel, etc.) via the communication system 104. If desired, the system 10 may be configured so that data (e.g. commands) may also be received by the control unit 82 directly or through the communication system 104 from one or more external source(s). The exemplary data communication system 104 may have any suitable form, configuration, components and operation. For example, the communication system 104 may include at least one data link. However, some embodiments may not include a communication system 104, or the communication system 104 may be integral to the control unit 82.

Any suitable techniques and mechanisms for data transmission to or from the control unit 82, communication system 104 or other component of the system 10 may be used, such as (i) one or more wet mateable electrical connectors, (ii) one or more inductive couplings, (iii) SCADA, acoustic, sonar or optical transmission, (iv) radio, or wireless, transmission, (v) fiber optics (or other) cable transmission and (vi) detectable pressure pulses or changes in the pipeline 20. In this embodiment, the communication system 104 is a radio frequency data transmitter configured to transmit data from the control unit 82 to any desired external source (e.g. FHS deployed at or connected to the launch end of the pipeline 20, underwater vehicle (UV), marine vessel, fixed installation, etc.). In some scenarios, short range transmission between the communication system 104 and a UV may be preferred, such as to assist in minimizing ambient noise, other interference and signal reflection that may decrease transmission effectiveness or accuracy.

The system 10 (e.g. FIGS. 1-5) may be configured so that data may be communicated via the communication system 104 between the control unit 82 and one or more external sources at any desired time (e.g. before, during and/or after flooding, hydrotesting, dewatering, fluid sampling of the pipeline 20). For example, a data record may be compiled by the control unit 82 with information relating to one or more among flooding, hydrotesting, dewatering and fluid sampling of the pipeline and transmitted to one or more external sources via the communication system 104. In some embodiments, the data record may be retrievable while the skid frame 14 is deployed on the sea floor 18 or after the skid frame 14 is returned to surface from its temporary subsea location. When the communication system 104 is used during hydrotesting, for example, the engineer in charge (or other personnel) may periodically use data received through the communication system 104 to check the status or review the progress of the hydrotesting operations. For still a further example, one or more external sources may have the capability to override operation of the control unit 82 via the communication system 104, such as during an emergency or unplanned event.

Referring again to the embodiment of FIG. 1, the exemplary battery 86 is configured to provide all necessary electrical power for autonomous operation of the system 10. For example, battery power may be provided through a voltage converter to the control unit 82 and other components which may be included in the system 10, such as described above. The battery 86 may include any suitable battery technology, as is or becomes further known. For example, the battery 86 may be rechargeable and include suitable underwater packaging and pressure-resistant or pressure-compensated housings. When a rechargeable battery is used, a UV 12 may be used to temporarily connect an electrical supply underwater to recharge the battery. The connection may, for example, include a wet mateable electrical connector or an inductive coupling, and the electrical supply may be from the UV umbilical or tether, or may be from a separate line. In other embodiments, the battery 86 may be rechargeable from the surface, such as via an umbilical from a marine vessel or fixed installation.

In some embodiments, the battery 86 may not be carried on the skid frame 14, but instead provided in a separate unit deployed to the sea floor 18 or otherwise proximate to the skid frame 14 and electrically connected with the system 10. In yet other embodiments, one or more stand-alone batteries may be deployed to the sea floor 18 and electrically connected with the system 10 (e.g. by a UV 12), such as to augment, supplement or increase the power supply of the system 10. If desired, multiple stand-alone batteries may be alternatively deployed, retrieved, recharged (e.g. from a UV 12, marine vessel or fixed installation) and re-deployed, such as to provide continuous power to the system 10.

Still referring to FIG. 1, for operation of the exemplary system 10, the skid frame 14 is positioned proximate, or coupled, to the receiving end 24 of the pipeline 20, pig receiver 30 or manifold 36 and the system 10 is fluidly coupled to the pipeline 20 in any desired manner and at any desired time. For example, the skid frame 14 may be mechanically coupled to the pipeline 20 and/or the fluid flow conduit 70 may be fluidly coupled to the fluid exhaust conduit 58 of the pipeline 20 prior to, or at the time of, installation of the pig receiver 30 on the pipeline 20 and deployed to the sea floor 18 together with the pipeline 20. For another example, the system 10 may be remotely fluidly and/or mechanically coupled, or positioned proximate, to the pipeline 20 after the pipeline 20 is placed on the sea floor 18. In some embodiments, the skid frame 14 may be mechanically coupled to the pipeline 20 at or proximate to the receiving end 24 thereof, such as by the UV 12 or other suitable manner. In other embodiments, the skid frame 14 may be placed adjacent to the pipeline 20. The fluid flow conduit 70 may be fluidly coupled to the fluid exhaust conduit 58, for example, by hot stab, using a rigid pipe, hose or hose bundle, such as with the use of an automated loading arm on the skid frame 14.

In some embodiments, a jumper 90 extendable from the skid frame 14 may be connectable to the pipeline 20. The jumper 90 may have any desired construction, configuration and operation suitable to provide a fluid connection between the system 10 and the pipeline 20. The jumper 90 may, for example, include flexible pipe and/or a loading arm with hinged joints, such as may be useful for spanning varying distances, angles and heights of the skid frame 14 relative to the pipeline 20. For another example, the jumper 90 may be a rigid pipe extending from the skid frame 14. It should be noted that the methods and apparatus for mechanically and/or fluidly coupling the system 10 to the pipeline 20 are not limiting upon the present disclosure or appended claims, unless, and only to the extent as may be explicitly recited in a particular appended claim and only with respect to that claim and any claims depending therefrom.

The UV 12 can also be used to initially turn on the control unit 82. In other embodiments, the control unit 82 may be deployed in an "on" state, a time-delayed "on" state, or could be activated wirelessly or with another suitable technique. In accordance with embodiments of the present disclosure, the UV 12 may not otherwise be necessary in connection with operations performed by the system 10.

In accordance with the present disclosure, in many embodiments, the system 10 (e.g. FIGS. 1-5) is useful to selectively allow the flow of fluid out of the pipeline 20 at the receiving end 24 thereof any time the pipeline 20 contains fluid (typically at the external (sea water) pressure) without the involvement of a UV 12, or an external source at the surface, at the pig receiving end 24 (or, in some cases, at both ends) of the pipeline 20. In various embodiments, the system 10 is useful to selectively disallow the flow of fluid out of the pipeline 20 without the involvement of a UV, or an external source at the surface, at the pig receiving end 24 (or, in some cases, at both ends) of the pipeline 20.

Referring again to FIG. 1, in an example operation involving the use of the illustrated system 10, to facilitate flooding, the flow isolation valve(s) 76 are positioned in an open position. If desired, the system 10 may be initially installed or deployed with the valves 76 opened. During typical filling and/or flooding operations, one or more pigs 32 are launched with water at the launch end of the pipeline 20. As the pig 32 moves through the pipeline 20, pressure will typically increase in the pipeline 20 (e.g. from atmospheric pressure up to the external (sea-water) pressure) and cause one or more of the check valve(s) 74 to open and allow fluid to exit the pipeline 20 (through the fluid flow conduit 70).

In accordance with an independent aspect of use of the illustrated embodiment, after the pig 32 arrives in the pig receiver 30 at the end of flooding (e.g. comes to rest against the pig stop 40), the exemplary control unit 82 will, without the involvement of a UV, or an external source at the surface, at the pig receiving end 24 (or, in some cases, at both ends) of the pipeline 20, facilitate the transition to hydrotesting by (i) detecting the end of successful flooding operations or determining it is time to close the flow isolation valve(s) 76 and (ii) closing the valve(s) 76 to disallow fluid flow out of the pipeline 20 at the receiving end 24 thereof. The control unit 82 may close the valve(s) 76 in any suitable manner. For example, the illustrated control unit 82 sends a signal to the valve actuators/power assemblies 78 associated with the valves 76 to close the valves 76. Once the flow isolation valve(s) 76 are closed, the pipeline 20 is fluidly isolated and ready for hydrotesting.

Any suitable apparatus and methods may be used for the control unit 82 to detect the completion of (successful) flooding operations and/or confirm it is time to close the valve(s) 76 to allow for hydrotesting. For example, the control unit 82 may be notified, or detect, that the flooding operation is complete. In some embodiments, the control unit 82 receives one or more signals that all the pigs 32 have docked in the pig receiver 30 or otherwise that flooding is complete. For example, the signal(s) may be sent by the pig stop 40. For another example, a pig signaler 34 on one or more of the pigs 32 (e.g. the last-to-arrive pig 32) may emit one or more signals (e.g. of a particular frequency) that informs the control unit 82 that flooding is complete. The control unit 82 may receive the signal(s) directly, or through another component, such as the communication system 104 or a pig detection system 84 (if included), which notifies the control unit 82 of the received signal(s), that the flooding operation is finished or to close or leave open the valve(s) 76. For example, the pig signaler 34 on one or more of the pigs 32 may communicate via acoustic or electromagnetic transmission to the pig detection system 84.

In some embodiments, the control unit 82 may be configured to receive, evaluate and/or act upon signals received from one or more "intelligent" pigs 32 used in the flooding operation. For example, one or more of the intelligent pigs 32 may be configured to evaluate the condition of the interior of the pipeline 20 (e.g. detect defects in the pipeline 20, measure or confirm the bore (e.g. inner diameter) of the pipeline 20, etc.) as it passes through the pipeline 20 and emit one or more signals detectable by the system 10 based at least partially upon the measured condition(s) of the pipeline 20. As used herein and in the appended claims, the terms "intelligent pig" and variations thereof means one or more devices movable through a subsea pipeline from the launch end to the receiving end thereof and configured to evaluate the condition (e.g. detect defects in the pipeline, measure or confirm the bore (e.g. inner diameter) of the pipeline, etc.) of the interior of the pipeline as it passes therethrough and emit one or more signals based at least partially upon the measured condition(s) of the pipeline.

The intelligent pig 32, when included, may have any suitable form, configuration and operation and may communicate with the control unit 82 or other component of the system 10 in any suitable manner. In various embodiments, the intelligent pig 32 may have one or more gage plates and provide signals based at least partially upon the condition of the gage plate(s) as the intelligent pig 32 moves through the pipeline 20 or thereafter. For example, the gage plate may be connected with the pig signaler 34 on one or more of the intelligent pigs 32. If the gage plate is not damaged, the pig signaler 34 may be configured to transmit one or more signals (e.g. of a particular frequency) recognizable by the control unit 82 that there is not a problem or confirming the pipeline 20 has been gaged within acceptable limits (an "all-OK" signal). If the gage plate is damaged, the pig signaler 34 may be configured to transmit one or more different signals recognizable by the control unit 82 (e.g. of a different frequency) that there is a problem (a "not OK" signal). If one or more "all-OK" signals are received, the exemplary control unit 82 will cause the flow isolation valve(s) 76 to close. If one or more "not OK" signals are received, the illustrated control unit 82 will leave the valve(s) 76 in an open position, send out one or more particular signals through the communication system 104 and/or take other desired action. One presently commercially available intelligent pig having one or more gage plates that is useful with some embodiments of the system 10 is the "Smart Gage Tool" (SGT) by Baker Hughes Incorporated, which incorporates a commercially available acoustic pinger. To receive the signals therefrom, for example, the exemplary pig detection system 84 may include one or more commercially available acoustic receivers.

Another exemplary embodiment of an intelligent pig 32 includes caliper arms, or fingers, extending at least partially around the intelligent pig 32 and evaluates the condition of, or detects defects in, the pipeline 20. This type of intelligent pig 32 may communicate with the control unit 82 or other component of the system 10 similarly as described above. For example, if the caliper arms detect no significant damage to or flaws in the pipeline 20, the pig signaler 34 may transmit one or more signals (e.g. of a particular frequency) recognizable by the control unit 82 that there is not a problem or confirming the pipeline 20 has been gaged within acceptable limits (an "all-OK" signal). If the caliper arms determine damage to or flaws in the pipeline 20, the pig signaler 34 may be configured to transmit one or more different signals recognizable by the control unit 82 (e.g. of a different frequency) that there is a problem (a "not OK" signal). In some embodiments, the intelligent pig 32 may transmit further information to the control unit 82 or other component(s) of the system 10 about the condition of the pipeline 20. One presently commercially available intelligent pig having caliper arms and being useful with some embodiments of the system 10 is the "Profile Caliper Pig" by Baker Hughes Incorporated.

For another example apparatus and/or methods useful for the control unit 82 to detect the end of successful flooding operations and/or confirm it is time to close the valve(s) 76 involves the control unit 82 being provided one or more fluid flow, temperature or pressure indications that is uniquely identifiable by the control unit 82 to signify the end of the flooding operations, that the flooding was successful or that the last-to-arrive pig 32 has arrived in the pig receiver 30. In some embodiments, one or more pressure transducers 94 and/or temperature transducers 96 coupled to the conduit 70 may communicate one or more signals or data to the control unit 82 to signify or confirm the end of flooding, that flooding was successful or the last-to-arrive pig 32 has arrived in the pig receiver 30.

In some embodiments, the control unit 82 may be configured to receive multiple notifications, one or more of which is uniquely identifiable by the control unit 82 to cause it to close the valve(s) 76 and/or take other actions (e.g. send a signal to the surface, a UV or FHS via the communication system 104). If desired, the control unit 82 may be configured to provide a desired time delay between the end of the flooding operation and the closing of the flow isolation valve(s) 76, such as to serve as notification to an external source that flooding has been completed and/or was successful or unsuccessful and/or that hydrotesting can be initiated, to allow time for other actions to be initiated at the launch end or elsewhere, or any other purpose.

Still referring to the embodiment of FIG. 1, if desired, the system 10 may be configured to operate in conjunction with and/or communicate with a FHS. In some embodiments, the closing of the flow isolation valve(s) 76 by the control unit 82 after flooding may be communicated to, or detected by, the FHS to signify "all-OK" or "proceed with hydrotest". For example, the FHS may apply pressure to the pipeline 20 from the launch end to detect whether the internal pressure in the pipeline 20 has changed due to closure of the flow isolation valve(s) 76. If a pressure increase is detected, the FHS may be configured to assume there is no problem (e.g. the gage plate on an intelligent pig 32 was not damaged or the pipeline 20 has been gaged within acceptable limits) and that the pipeline 20 is ready for hydrotest. If no pressure increase is detected, the FHS may be configured to assume there is a problem (e.g. the gage plate on an intelligent pig 32 is damaged or the pipeline 20 has not been gaged within acceptable limits). In some embodiments, the FHS may determine that the pressure inside the pipeline 20 has not changed after a certain elapsed time after the last pig 32 has docked in the pig receiver 30, indicating the valves 76 were not closed by the system 10, serving as notification of an event or condition (e.g. the control unit 82 detected a problem) and warranting a particular response or action by the FHS or other external source.

For another example, a particular time delay in closing the valves 76 by the control unit 82 after the last pig 32 docks in the pig receiver 30 could signify to the FHS that the pipeline 20 is ready for hydrotesting or the existence of another particular condition, problem, etc. For yet another example, the control unit 82 may send a notification through the communication system 104 to the FHS indicating that the pipeline 20 is, or is not, ready for hydrotesting, or other information.

After the flow isolation valves 76 are autonomously closed by the control unit 82 and no indication of problems or other reasons to delay hydrotesting, the pipeline 20 may be hydrotested without the need for any external intervention (e.g. UV, diver, marine vessel, fixed installation, other external source, etc.) at the receiving end 24 of the pipeline 20. In some embodiments, hydrotesting may be performed without any external intervention at either end of the pipeline, such as when the system 10 is used with a subsea FHS, such as the automated subsea pipeline servicing system disclosed in U.S. patent application Ser. No. 13/614,409. If desired, the FHS may be configured to measure pressure, temperature, flow rates (e.g. via pressure transducer 94, temperature transducer 96, flow meter 108 (e.g. FIG. 2)), other variables or a combination thereof during the hydrotest and log such data (e.g. in the control unit 82), display the data as desired on the display 100, transmit the data to any desired external source (e.g. through the communication system 104) or a combination thereof.

After completion and/or acceptance or abandonment of the hydrotest, the pipeline 20 will typically be depressurized (e.g. by the FHS, from the surface or other external source) back down to the external (sea water) pressure at the launch end of the pipeline 20. After depressurization, the pipeline 20 will typically be full of water at the same approximate pressure as the sea water 22. In some instances, there may be no further need for the system 10, which can be disconnected from the pipeline 20 and recovered at any desired time. In other instances, in accordance with another independent aspect of some embodiments of the present disclosure, the system 10 (e.g. FIGS. 2-5) may be used to allow the pipeline 20 be dewatered in the same direction it was originally filled. For example, the control unit 82 may be configured to autonomously open the flow isolation valve(s) 76 to allow water to exit or be expelled from the pipeline 20 at the receiving end 24.

Figure 2:
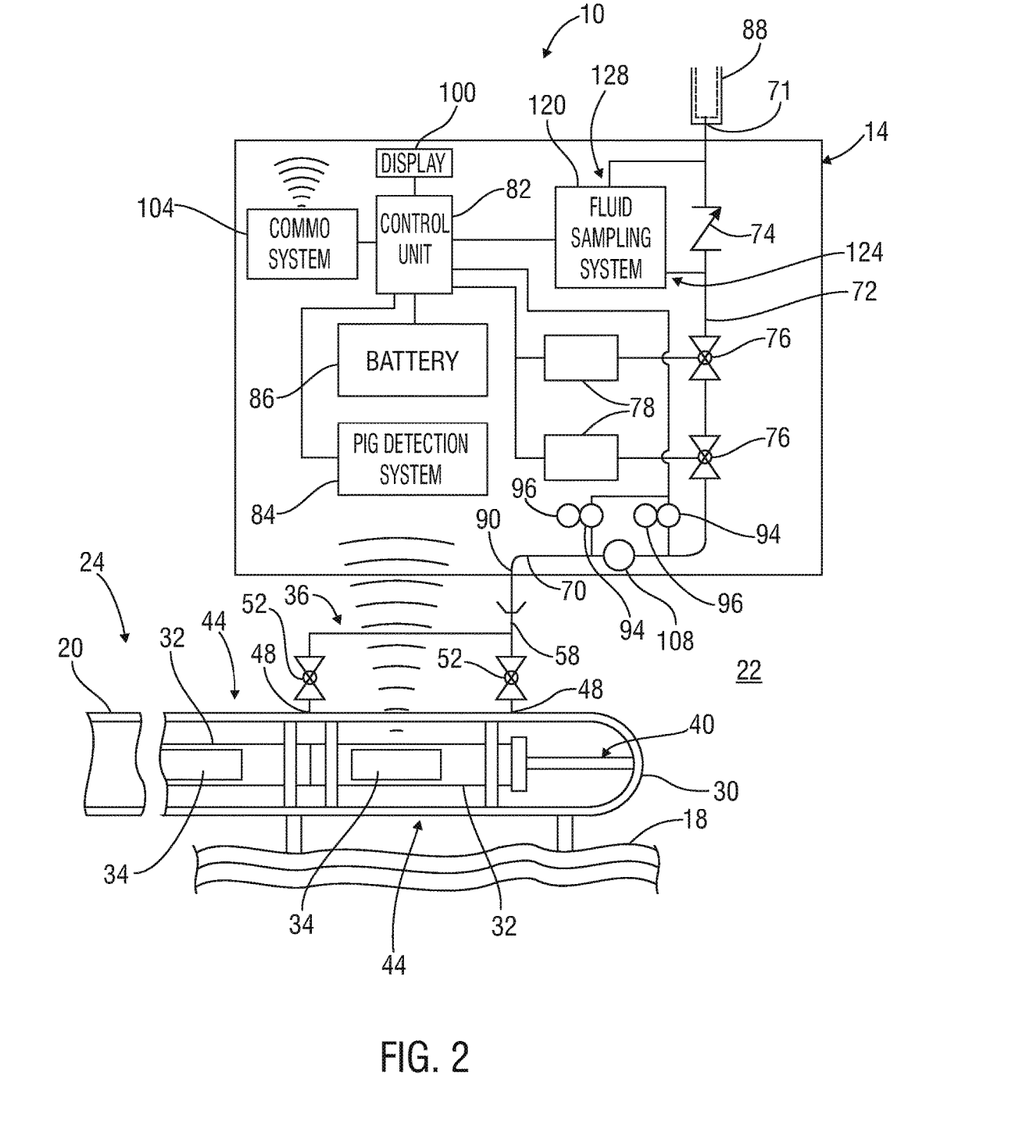
FIG. 2 is a diagrammatic view of another embodiment of an automated subsea valve actuation system shown engaged with a pipeline on the sea floor.

Referring now to FIG. 2, any suitable criteria, apparatus and methods may be used for the control unit 82 to determine the hydrotest has been completed, accepted or abandoned, when it is desired to initiate dewatering or otherwise when to autonomously open the valves 76. For example, a pressure change, or sequence of pressurization/depressurization events, in the pipeline 20 could be initiated at the launch end of the pipeline 20 (e.g. by the FHS) and detected by the system 10 to serve as an "all-OK" signal to open the valves 76. In the illustrated embodiment, one or more pressure transducers 94 will detect one or more pressure change(s) and communicate them to the control unit 82. The control unit 82 will be pre-programmed to recognize one or more particular pressure reading(s) or changes to signify "all OK" to initiate dewatering by autonomously opening the valves 76.

In some embodiments, the system 10 can be configured to recognize all or part of the pressure-down sequence performed at the launch end during the hydrotest, such as described in U.S. patent application Ser. No. 13/614,409, to determine when to autonomously open the valves 76. In some applications, if the pressure-up and/or pressure-down processes during hydrotesting need to be repeated (e.g. when a leak is detected), one or more special pressure signals may be provided from the launch end to signify to the control unit 82 that the hydrotest has been completed, accepted or abandoned or otherwise to indicate when the system 10 should autonomously open the valves 76.

Other exemplary techniques for the control unit 82 to determine when to open the valves 76 (e.g. to allow dewatering) may be based at least partially upon any other suitable signals or conditions recognizable by the control unit 82. For example, the timing of events associated with the hydrotest may trigger the control unit 82 to open the valves 76, such as a certain pre-programmed elapsed time from the start or end of the hydrotest, between one or more phases of the hydrotest, etc. Other exemplary methods of triggering the control unit 82 to autonomously open the valve(s) 76 include one or more signals sent from the launch end of the pipeline 20 (e.g. an "all-OK" by the FHS), a UV, vessel, platform or other source at the surface or another external source directly to the control unit 82 or through one or more other components, such as the communication system 104. If one or more "not OK" signals are received, the control unit 82 may be configured to leave the valve(s) 76 is a closed position, send out a particular signal through the communication system 104, take other desired action, or a combination thereof.

In some embodiments, the control unit 82 may be configured to receive multiple notifications and/or detect multiple conditions, one or more of which is uniquely identifiable by the control unit 82 to cause it to open the valve(s) 76 and/or take other actions (e.g. send a signal to the surface, a UV or FHS via the communication system 104). If desired, the control unit 82 may be configured to provide a desired time delay between the end of the hydrotesting operation and the opening of the flow isolation valve(s) 76, such as to serve as notification to an external source that hydrotesting has been completed and/or was successful and/or that dewatering can be initiated, to allow time for other actions at the launch end or elsewhere, or any other suitable purpose.

In various embodiments, the opening of the flow isolation valve(s) 76 by the control unit 82 after hydrotesting may be communicated to, or detected by, the FHS to signify "all-OK" or "proceed with dewatering". For example, the FHS may apply pressure to the pipeline 20 from the launch end to detect whether the internal pressure in the pipeline 20 has changed due to the opening of the flow isolation valve(s) 76. For another example, a particular time delay in opening the valves 76 by the control unit 82 could signify to the FHS that the pipeline 20 is ready for dewatering or the existence of another particular condition, problem, etc. For another example, the control unit 82 may send a notification through the communication system 104 to the FHS indicating that the pipeline 20 is, or is not, ready for dewatering, or other information. For still a further example, in some embodiments, the FHS may determine that the pressure inside the pipeline 20 has not changed after a certain elapsed time after the completion of the hydrotest, indicating the valves 76 were not opened by the system 10, serving as notification of an event or condition (e.g. the control unit 82 detected a problem) and warranting a particular response or action by the FHS or other external source.

Still referring to the embodiment of FIG. 2, once the control unit 82 opens the valves 76, dewatering may proceed. If desired, progress of the dewatering may be monitored in the system by components on the system 10. For example, the system 10 may be configured to measure pressure, temperature, flow rates (e.g. via pressure transducer 94, temperature transducer 96, flow meter 108 (e.g. FIG. 2)), other variables or a combination thereof during dewatering and log such data (e.g. in the control unit 82), display the data as desired on the display 100, transmit the data to any desired external source (e.g. through the communication system 104) or a combination thereof. It should be noted that the pressure and temperature transducers 94, 96 shown in FIGS. 2-5 may be internal to, or otherwise part of, the illustrated flow meter 108.

Figure 3:
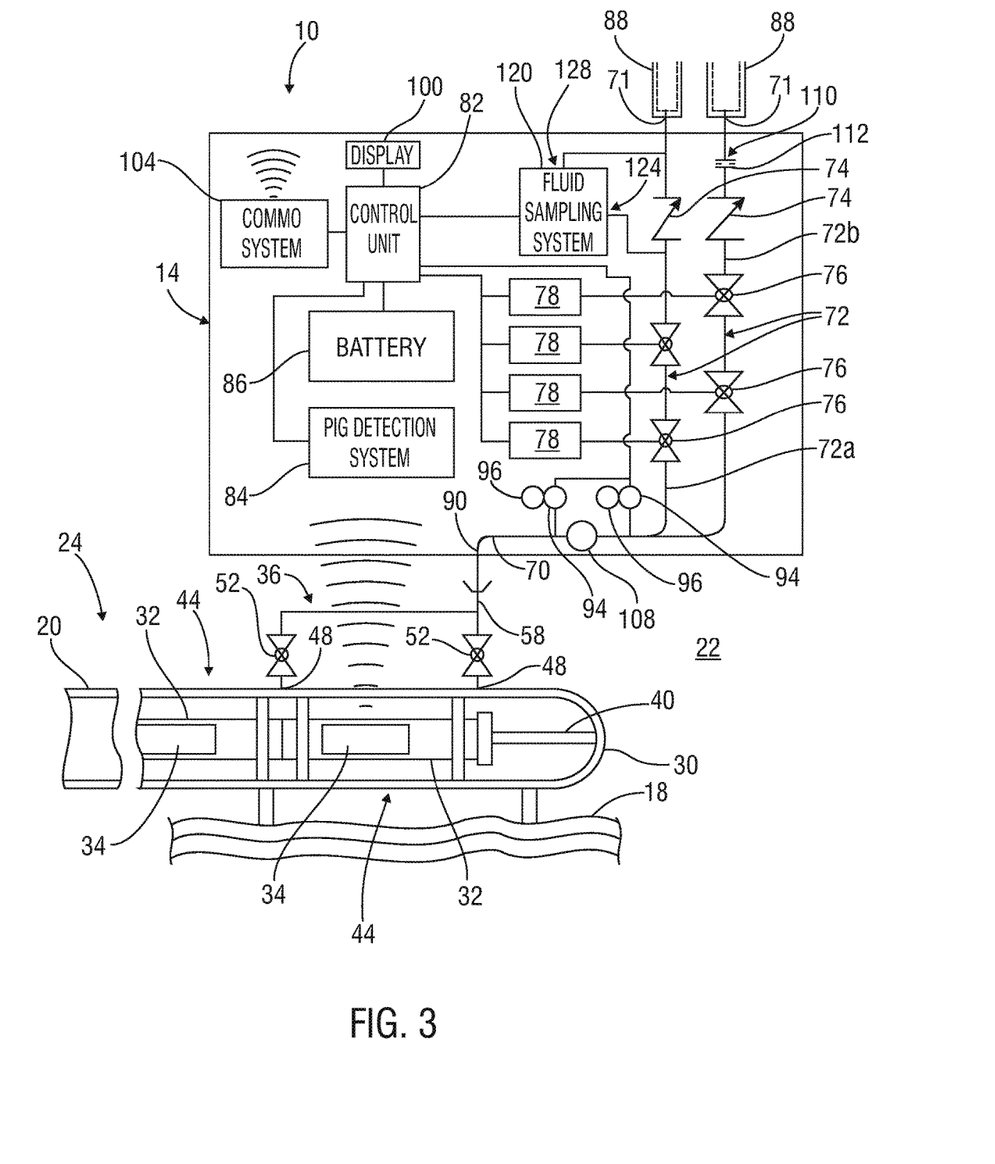
FIG. 3 is a diagrammatic view of yet another embodiment of an automated subsea valve actuation system shown engaged with a pipeline on the sea floor.

Now referring to FIG. 3, in some scenarios, the system 10 may be configured to allow the control unit 82 to selectively, autonomously change or control the flow-rate and/or pressure of the fluid moving through the pipeline 20. In the present embodiment, this feature may be used during dewatering, such as to control the dewatering pig speed or other purpose. For example, one or more flow restrictors 110 may be included to provide an alternate (pre-set) flow rate and/or pressure of fluid moving through the pipeline 20 and system 10 that differs from the flow rate through the conduit 70. The flow restrictor 110 may have any suitable form, configuration and operation. As used herein the term "flow restrictor" and variations thereof means a component or arrangement of components fluidly coupled to the fluid flow conduit 70 and configured to change the flow rate and/or pressure of fluid passing therethrough. Some examples of flow restrictors 110 include one or more orifice plates 112, one or more restricted-flow or expanded-flow tubing sections, or the like.

Based at least partially upon any desired criteria (e.g. flow rate, pressure, etc.), the exemplary control unit 82 can switch between the different flow options. In this embodiment, the fluid flow conduit 70 includes multiple branches 72 having (i) different-sized inner diameters and/or (ii) different-sized flow restrictors 110, or a combination thereof, to allow the control unit 82 to selectively autonomously switch between multiple fluid flow rate and/or pressure options. In the illustrated embodiment, when only a first branch 72a of the conduit 70 is open, the pipeline fluid flow rate and pressure will be based upon the size of the fluid flow conduit 70. When only a second illustrated branch 72b is open, the pipeline fluid flow rate and pressure will be based upon the size of the orifice plate 112. The illustrated control unit 82 can autonomously switch between these two flow velocity/pressure options by opening and closing the flow isolation valves 76 in the respective branches 72a, 72b. However, the present disclosure is not limited to this particular arrangement. Any number of branches 72 and combinations of arrangements of different flow restrictors 110 may be included to provide two, three, four, five or more different pipeline fluid flow velocity/pressure options for the system 10.

Figure 4:
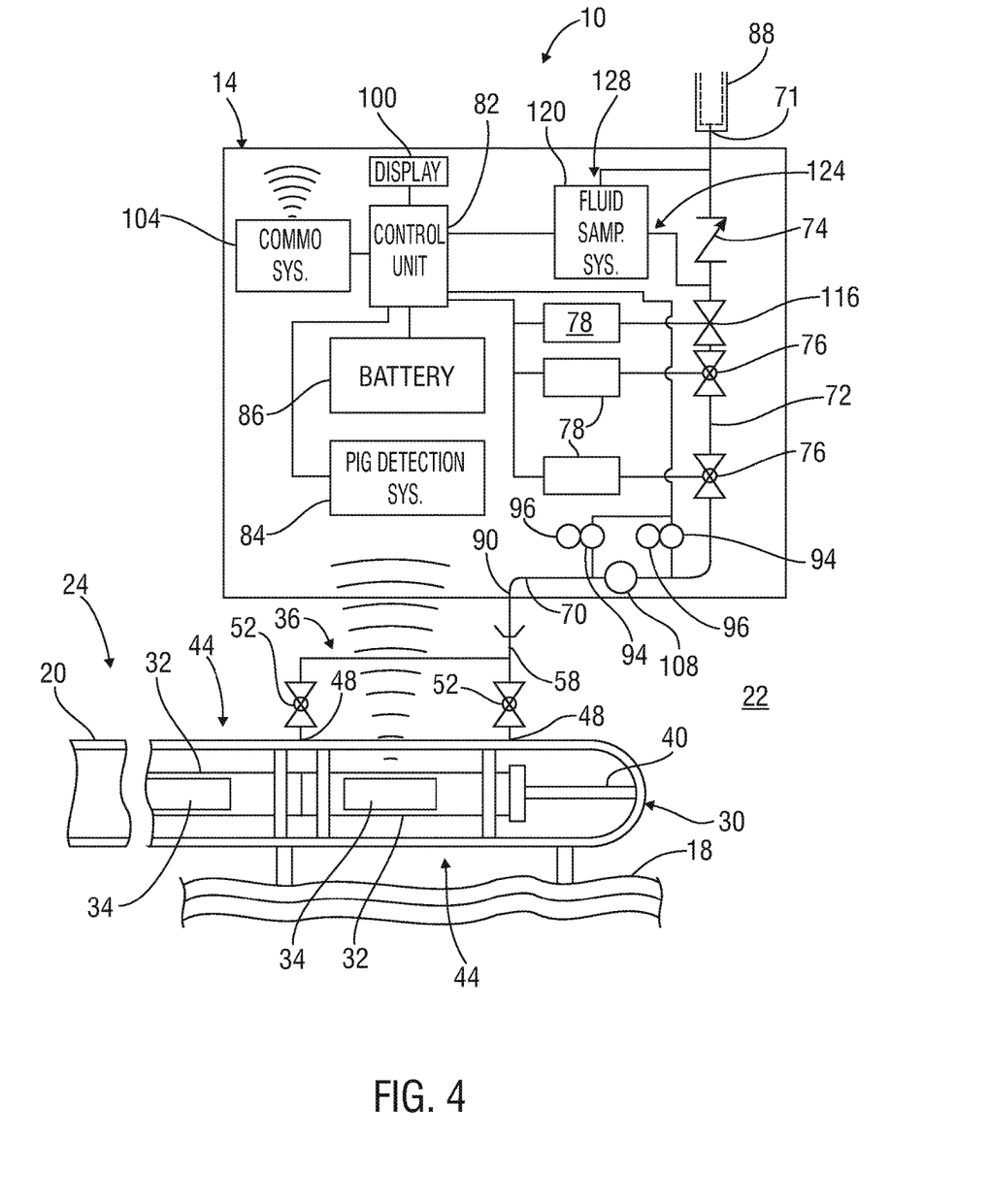
FIG. 4 is a diagrammatic view of still another embodiment of an automated subsea valve actuation system shown engaged with a pipeline on the sea floor.

Now referring to the embodiment of FIG. 4, the system 10 may also or instead include one or more variable control valves 116 fluidly coupled to the fluid flow conduit 70 to allow the control unit 82 to selectively, autonomously change or control the flow rate and/or pressure of the fluid in the pipeline 20, such as during dewatering. The variable control valve 116 may have any suitable, form configuration and operation. For example, the valve 116 may be a gate valve associated with a valve actuator/power assembly 78. The exemplary valve 116 may be selectively actuated by the control unit 82 to change the flow rate and/or pressure of fluid therethrough. In the illustrated embodiment, the control unit 82 can vary the flow rate and/or pressure of fluid through the pipeline 20 by instructing the illustrated valve actuator/power assembly 78 to change the position of the variable control valve 116.

The system 10 may include any desired combination of one or more variable control valves 116, flow restrictors 110 and/or multiple varied-ID branches 72 of the fluid flow conduit 70 to autonomously and selectively provide the desired fluid flow rate/pressure control and variability. One or more exemplary variable control valves 116, flow restrictors 110 and/or multiple varied-ID branches 72 of the fluid flow conduit 70 may be configured to change the flow rate and/or pressure of the fluid within any desired range, on any desired schedule and in any desired sequence. For example, the control unit 82 may continually vary the flow rate/pressure in accordance with a pre-programmed sequence, based at least partially upon feedback from one or more other components of the system 10 (e.g. pressure transducer 94, temperature transducer 96, flow meter 108) and/or one or more external sources (e.g. FHS), based upon any other desired criteria or a combination thereof. For example, the control unit 82 may be programmed to dewater the pipeline 20 at x gallons per minute (e.g. 1,000 gpm) (the "desired" or "particular" fluid flow rate). During dewatering, one or more flow meters 108 (positioned at any desired location in fluid communication with the conduit 70) may be configured to repeatedly measure the flow rate in the exemplary conduit 70 and communicate the data to the control unit 82 in real time. In response, the control unit 82 may be configured to vary the position of one or more variable control valve 116 or vary flow through one or more flow restrictors 110 or multiple varied-ID branches 72 of the fluid flow conduit 70, or a combination thereof, to maintain the desired (particular) fluid (and pig) velocity. For another example, during dewatering, one or more pressure transducers 94 positioned at any desired location in fluid communication with the conduit 70) may be configured to repeatedly measure the pressure in the exemplary conduit 70 and communicate the data to the control unit 82 in real time. In response, the control unit 82 may be configured to vary the position of one or more variable control valve 116 or vary flow through one or more flow restrictors 110 or multiple varied-ID branches 72 of the fluid flow conduit 70, or a combination thereof, to maintain the desired (particular) fluid (and pig) velocity and/or pressure.

For another example, in the embodiment of FIG. 4, the fluid flow conduit 70 may have a particular inner diameter (ID) to achieve a desired fluid (and pig) velocity and the exemplary variable control valve 116 may be used by the control unit 82 to fine tune its control of the fluid and pig velocity. For yet another example, a branch of the conduit 70 may be added having a different ID than the conduit 70 or include a flow restrictor (not shown) to provide another fluid flow rate option.

If desired, the exemplary control unit 82 may be configured to autonomously detect the completion of dewatering of the pipeline 20. For example, the control unit 82 may determine the dewatering has been completed based upon the arrival of the last-to-arrive pig 32 in the pig receiver 30, the presence of gas (or a particular component or form of gas (e.g. nitrogen)) in the fluid passing through the pipeline 20, one or more readings of the flow meter(s) 108 or other criteria. At that time or otherwise when desired, the exemplary control unit 82 may be configured to autonomously close the flow isolation valves 76 (and/or variable control valves 116) to fluidly isolate the pipeline 20 and, in at least some instances, leave the pipeline 20 full of the fluid provided therein during dewatering and ready for pressurization or filling with hydrocarbons.

Figure 5:
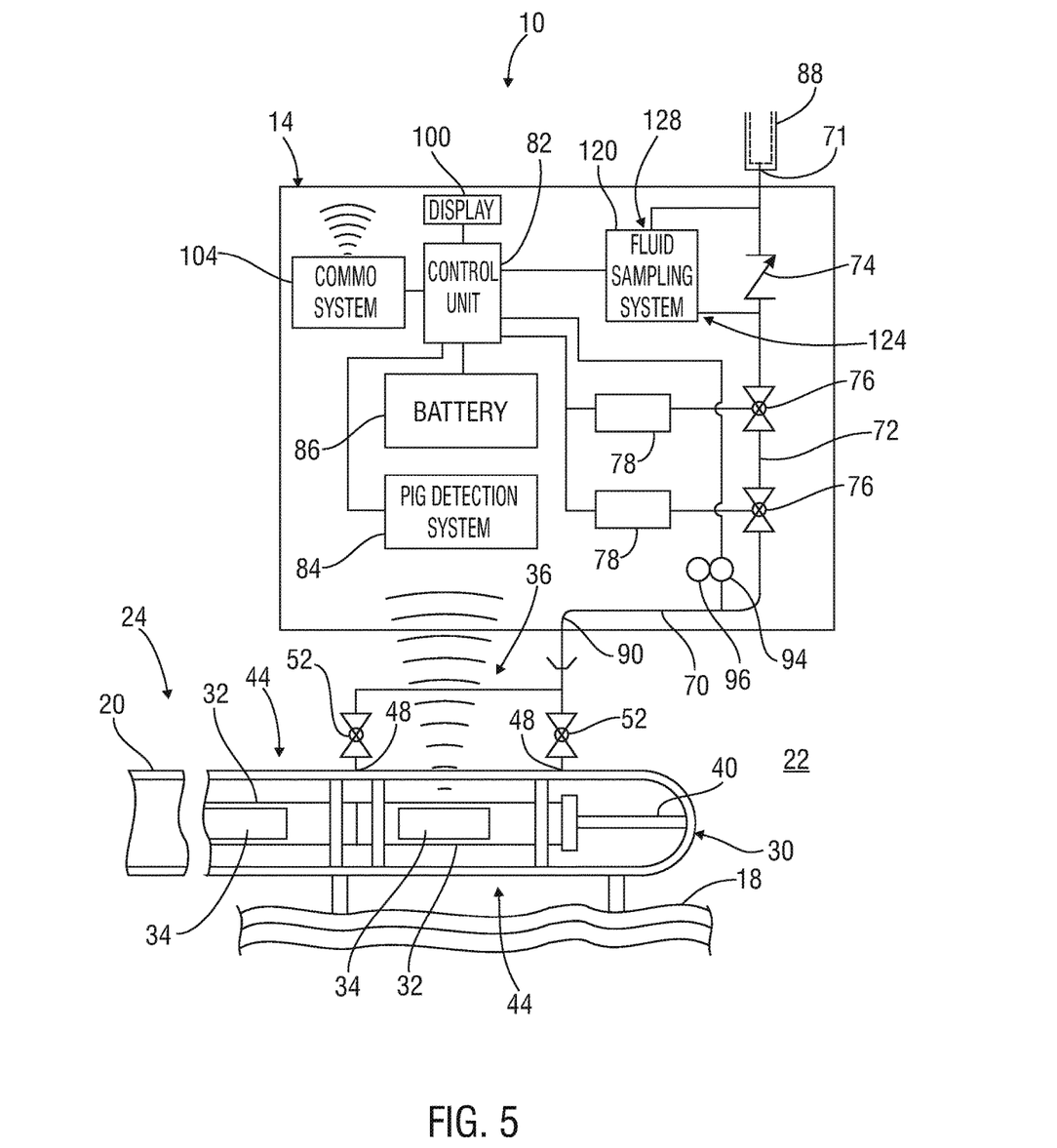
FIG. 5 is a diagrammatic view of a further embodiment of an automated subsea valve actuation system shown engaged with a pipeline on the sea floor.

Now referring to FIG. 5, in accordance with another independent aspect of some embodiments of the present disclosure, the automated subsea valve actuation system 10 may include one or more fluid sampling and/or monitoring systems 120 for autonomously sampling, testing and/or monitoring fluid exiting the pipeline 20 without the involvement of a UV or an external source at the surface. The fluid sampling and/or monitoring system 120 may be used during any phase of operation of the system 10 or testing or use of the pipeline 20 to autonomously analyze and/or sample the fluids and/or monitor their condition at the receiving end 24 of the pipeline 20. The illustrated system 120 may be configured to store samples of these fluids (e.g. for subsequent analysis) and/or monitor their condition, such as to determine the success of the dewatering operation, without the need for a UV, or umbilical or other connection to the surface (e.g. vessel, platform, etc.), at the receiving end 24 of the pipeline 20 during the dewatering operation, or for any other desired purpose. In some embodiments, data relating to the fluid samples, success of the dewatering operation and/or other data can be communicated by the control unit 82 (e.g. via the communication system 104) to any desired recipient (UV, surface vessel, FHS, etc.) on a real-time basis, as desired or when a vessel arrives at the location.

The fluid sampling and/or monitoring system may have any suitable form, components, construction, configuration and operation. In this embodiment, the input end 124 of fluid sampling and/or monitoring system 120 is shown fluidly coupled to the conduit 70 upstream of the check valve 74, with the discharge end 128 fluidly coupled to the conduit 70 downstream of the check valve 74. This allows sampling of fluids proximate to the exhaust end of the conduit 70. In other embodiments, the system 120 may be positioned elsewhere as desired.

Figure 6:
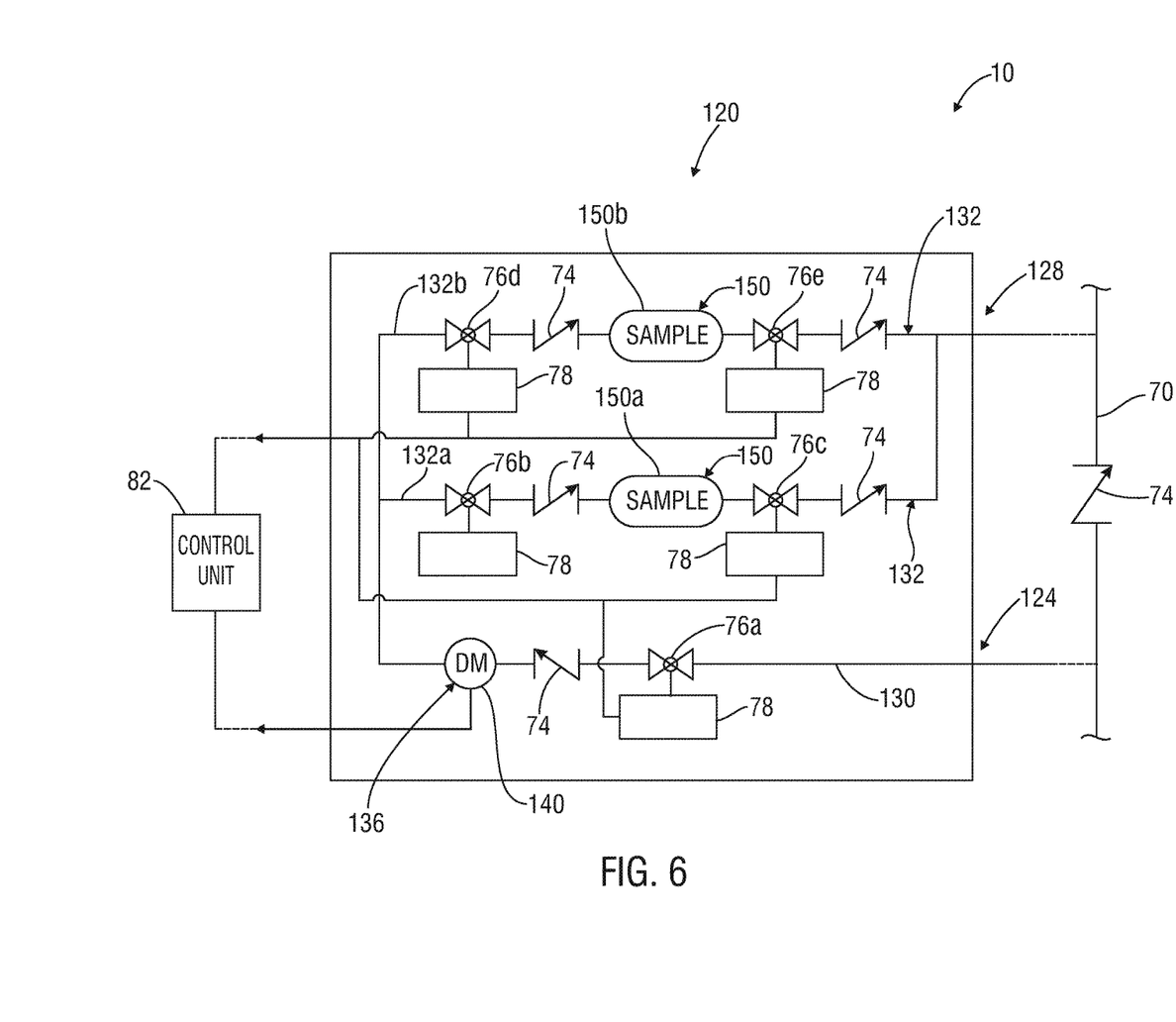
FIG. 6 is a diagrammatic view of an exemplary remote fluid sampling and/or monitoring system useful at the receiving end of the pipeline in accordance with the present disclosure.

Referring specifically to the embodiment of FIG. 6, the illustrated system 120 includes a main flow conduit 130 extending from its input end 124 to its discharge end 128. If desired, the main flow conduit 130 may have multiple branches 132. A first flow isolation valve 76a is shown fluidly coupled to the conduit 130 proximate to the input end 124 to allow/disallow fluid flow into the system 120. The exemplary valve 76a is controlled by the control unit 82 via a valve actuator/power assembly 78 similarly as described herein with respect to the other flow isolation valves 76 shown in the appended drawings. For example, the flow isolation valve 76a may be normally maintained in a closed position, allowing fluid to exit the pipeline 20 through the system 10 into the sea. In this embodiment, when it is desired to sample or check the condition of the fluids exiting the pipeline 20, the exemplary control unit 82 opens the flow isolation valve 76a. After the fluid is sampled, tested or monitored, or at intermediate stages, the exemplary control unit 82 may be configured to close the valve 76b. The control unit 82 may otherwise switch the valves 76b between open and closed positions as desired.

The illustrated system 120 also includes at least one fluid analyzer 136 and at least one fluid sampling bottle 150 fluidly coupled to the conduit 130. The fluid analyzer 136 may have any suitable form, configuration and operation and may be used to measure any desired, measurable characteristic(s) of fluid exiting the pipeline 20 and may also communicate its findings to the control unit 82 or other components(s) of the system 10. For liquids exiting the pipeline 20, for example, depending upon the particular situation, the fluid analyzer(s) 136 may include one or more instruments designed to measure one or more among density, turbidity, particle count, PH, chemical content, bacteria levels, specific gravity, chloride levels, oxygen content of water and hydrocarbons in water. For gases exiting the pipeline 20, for example, the fluid analyzer 136 may, if desired, be designed to measure one or more among oxygen content of nitrogen gas, hydrocarbons in nitrogen and dewpoint. In the illustrated example, the fluid analyzer 136 is a densitometer 140 useful to measure the density of the fluid passing through the conduit 130 and communicate such measurements to the control unit 82, such as for calculation of the fluid's specific gravity. The densitometer 140 may be useful, for example when hydrate inhibition fluids, such as methanol, glycol or kinetic hydrate inhibitors, are included as slugs between pigs 32 in a pig train during dewatering. If desired, the control unit 82 may be configured to control operation of the fluid analyzer 136, such as by actuating it as desired to take the desired measurements.

The fluid sampling bottle(s) 150 may also have any suitable form, configuration and operation. In this embodiment, each exemplary fluid sampling bottle 150 is located downstream of the fluid analyzer 136, for example, so that a sample of the fluid evaluated (or attempted to be evaluated) by the fluid analyzer 136 may be stored. In some scenarios, it may be desirable, for example, to take a sample of exiting fluid if the fluid analyzer 136 malfunctions or is believed to have malfunctioned.

Still referring to FIG. 6, the illustrated embodiment includes one fluid analyzer 136 and two fluid sampling bottles 150a, 150b, but any desired combination of fluid analyzers 136 and fluid sampling bottles 150 may be included (e.g. two densitometers 140 and four, six, seven or more fluid sampling bottles; one densitometer and five, six or more fluid sampling bottles; etc.).

In this embodiment, the system 120 includes a distinct branch 132a, 132b of the flow conduit 130 for each respective fluid sampling bottle 150a, 150b. Respective front and rear flow isolation valves 76b, 76c are fluidly coupled to the first conduit branch 132a on opposing sides of the illustrated first fluid sampling bottle 150a. Similarly, respective front and rear flow isolation valves 76d, 76e are fluidly coupled to the second conduit branch 132b on opposing sides of the second fluid sampling bottle 150b. The exemplary valves 76b-e are each controlled by the control unit 82 via a respective valve actuator/power assembly 78 similarly as described herein with respect to the other flow isolation valves 76 shown in the appended drawings. The valves 76b-e are used to open and close the conduit branches 132a, 132b as desired, such as to fill, isolate and/or flush out each respective associated bottle 150a, 150b.

Still referring to FIG. 6, in an example use of the illustrated embodiment of the system 120 without the involvement of a UV or an external source at the surface, the system 120 may be maintained in a closed valve state, with all of the flow isolation valves 76a-e normally closed. When it is desired to test and save a first sample of fluid exiting the pipeline 20, the illustrated control unit 82 opens the flow isolation valve 76a to allow a fluid sample to pass through the fluid analyzer 136, which measures the desired fluid characteristic(s). If desired, the control unit 82 may then close the valve 76a. In some embodiments, the control unit 82 may communicate with the fluid analyzer 136, such as to turn it on and/or off, receive information from it, etc. The exemplary control unit 82 opens the front isolation valve 76b of the first conduit branch 132a to allow the tested fluid to enter the fluid sampling bottle 150a. The rear isolation valve 76c in the branch 132a may remain closed, unless some flow-through is desired or the control unit 82 has another reason to open it. Thereafter, the illustrated control unit 82 closes the front isolation valve 76b of the first conduit branch 132a, sealing off the first conduit branch 132a and the first fluid sampling bottle 150a.

In this embodiment, when it is desired to test and save a second fluid sample, the control unit again opens the flow isolation valve 76a to allow another fluid sample to pass through the fluid analyzer 136 which measures the desired fluid characteristic(s). If desired, the control unit 82 may then close the valve 76a. In some embodiments, the control unit 82 may communicate with the fluid analyzer 136, such as to turn it on and/or off, receive information from it, etc. The illustrated control unit 82 opens the front isolation valve 76d in the second conduit branch 132b allow the second sample of tested fluid to enter the second fluid sampling bottle 150b. The rear isolation valve 76d in the branch 132b may remain closed, unless some flow-through is desired or the control unit 82 has another reason to open it. Thereafter, the illustrated control unit 82 closes the front isolation valve 76d of the second conduit branch 132b, sealing off the second conduit branch 132b and the second fluid sampling bottle 150b.

Still referring to the embodiment of FIG. 6, if it is desired to flush out a sample from any bottle 150, the control unit 82 opens the flow isolation valve 76a and the front and rear flow isolation valves 76b, 76c or 76d, 76e associated with the selected bottle 150. The above sequences can be repeated if the system 120 includes additional conduit branches 132 and fluid sampling bottles 150.

The illustrated system 120 also includes a series of check valves 74 to prevent backflow within the flow conduit 130 and/or any one or more branches 132 thereof. In this embodiment, the automated control of all of the flow isolation valves 76a-e by the control unit 82 allows selective, autonomous sampling, testing and/or monitoring fluid exiting the pipeline 20 without the involvement of a UV or an external source at the surface.

All components of the aforementioned embodiments of the system 10 are connected by suitable piping and cabling. Electrical equipment may be housed in pressure-resistant or pressure-compensated housings, as necessary.

The number of valves 74, 76, 116 included in the system 10 may vary depending on job specific parameters. The exemplary valves 76, 116 are powered and actuated by one or more valve actuator/power assemblies 78. Each valve actuator/power assembly combination of the exemplary system 10 is controlled by the control unit 82, powered by the battery 86 and configured to actuate the associated respective valve(s) 76, 116 based upon commands from the control unit 82. The valve actuator/power assemblies may have any suitable configuration, construction and operation. For example, the exemplary valve actuator/power assemblies may be electrically, hydraulically or pneumatically driven. Any suitable power arrangement may be used. If desired, one valve power assembly may be used to power multiple valve actuators in the system 10. Likewise, the same valve actuator/power assembly 78 may be used with multiple valves 76, 116. Furthermore, the type, configuration and operation of the valve actuator/power assemblies is not limiting upon the present disclosure.

Depending upon the programming of the control unit 82 and components of the system 10, at any desired time during any of the above operations, the control unit 82 may record and log fluid flow rates, temperature pressure and/or any other desired data and transmit data (e.g. via the communication system 104) to one or more external sources, or receive commands therefrom. At any desired time, the system 10 can be disengaged from the pipeline 20 and recovered.

Preferred embodiments of the present disclosure thus offer advantages over the prior art and are well adapted to carry out one or more of the objects of this disclosure. However, the present invention does not require each of the components and acts described above and is in no way limited to the above-described embodiments or methods of operation. Any one or more of the above components, features and processes may be employed in any suitable configuration without inclusion of other such components, features and processes. Moreover, the present invention includes additional features, capabilities, functions, methods, uses and applications that have not been specifically addressed herein but are, or will become, apparent from the description herein, the appended drawings and claims.

The methods that may be described above or claimed herein and any other methods which may fall within the scope of the appended claims can be performed in any desired suitable order and are not necessarily limited to any sequence described herein or as may be listed in the appended claims. Further, the methods of the present invention do not necessarily require use of the particular embodiments shown and described herein, but are equally applicable with any other suitable structure, form and configuration of components.

While exemplary embodiments of the invention have been shown and described, many variations, modifications and/or changes of the system, apparatus and methods of the present invention, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the invention and scope of appended claims. Thus, all matter herein set forth or shown in the accompanying drawings should be interpreted as illustrative, and the scope of the disclosure and the appended claims should not be limited to the embodiments described and shown herein.

The invention claimed is:

1. Method of remotely, selectively controlling the flow rate of fluid moving through a subsea pipeline during dewatering of the pipeline without the involvement of an external source at the surface, or a UV, at the pig receiving end of the pipeline, the pipeline having a launch end and an opposing pig receiving end, the method comprising:

fluidly coupling a fluid flow conduit of an automated, self-powered, self-controlled subsea valve actuation system to the pipeline at the pig receiving end thereof, the fluid flow conduit having multiple branches all in fluid communication with the pipeline and the sea, wherein each branch may be selectively opened and closed by actuating at least one flow isolation valve associated therewith without the involvement of an external source at the surface, or a UV, at the pig receiving end of the pipeline to change the flow rate of fluid flowing through the pipeline during dewatering of the pipeline;

allowing fluid to exit the pipeline to the sea through at least one fluid flow conduit branch during dewatering of the pipeline;

at least one flow meter fluidly coupled to the fluid flow conduit measuring the fluid flow rate in the fluid flow conduit during dewatering of the pipeline;

at least one of the flow meters emitting at least one signal relating to the fluid flow rate in the fluid flow conduit; and based at least partially upon one or more signals emitted by at least one of the flow meters and without the involvement of an external source at the surface, or a UV, at the pig receiving end of the pipeline, a control unit of the subsea valve actuation system selectively, autonomously actuating at least one flow isolation valve associated with at least one of the fluid flow conduit branches to open or close off fluid flow through the respective associated fluid flow conduit branch(es) to change the flow rate of fluid flowing through the pipeline during dewatering of the pipeline.

2. The method of claim 1 wherein it is desired to maintain a particular fluid flow rate in the pipeline during dewatering, further including:

pre-programming the control unit to maintain the particular fluid flow rate in the pipeline during dewatering of the pipeline, the at least one flow meter emitting multiple signals relating to the fluid flow rate in the fluid flow conduit in real time during dewatering of the pipeline, and based at least partially upon at least some of the signals emitted by at least one of the flow meters and without the involvement of an external source at the surface, or a UV, at the pig receiving end of the pipeline, the control unit selectively, autonomously, repeatedly changing the flow rate of fluid in the fluid flow conduit to maintain the particular fluid flow rate in the pipeline during dewatering.

3. The method of claim 1 further including during dewatering of the pipeline, the subsea valve actuation system remotely, selectively, autonomously analyzing one or more samples of fluid exiting the subsea pipeline at the pig receiving end of the pipeline without the involvement of an external source at the surface, or a UV, at the pig receiving end of the pipeline.

4. The method of claim 3 further including the control unit receiving data about one or more samples of fluid analyzed during the dewatering and transmitting such data to at least one desired recipient on a real-time basis.

5. The method of claim 1 further including the control unit detecting the completion of dewatering of the pipeline without the involvement of an external source at the surface, or a UV, at the pig receiving end of the pipeline, and once the control unit has detected the completion of dewatering, the control unit, without the involvement of an external source at the surface, or a UV, at the pig receiving end of the pipeline, selectively, autonomously closing all the flow isolation valves associated with the fluid flow conduit branches to fluidly isolate the subsea pipeline filled with fluid provided during dewatering of the pipeline.

6. Method of remotely, selectively controlling the flow rate of fluid moving through a subsea pipeline during dewatering of the pipeline without the involvement of an external source at the surface, or a UV, at the pig receiving end of the pipeline, the pipeline having a launch end and an opposing pig receiving end, the method comprising:

fluidly coupling a fluid flow conduit of an automated, self-powered, self-controlled subsea valve actuation system to the pipeline at the pig receiving end thereof;

at least one variable control valve fluidly coupled to the fluid flow conduit allowing fluid to exit the pipeline to the sea during dewatering of the pipeline;

at least one flow meter fluidly coupled to the fluid flow conduit measuring the fluid flow rate in the fluid flow conduit during dewatering of the pipeline;

at least one of the flow meters emitting at least one signal relating to the fluid flow rate in the fluid flow conduit; and based at least partially upon one or more signals emitted by at least one of the flow meters and without the involvement of an external source at the surface, or a UV, at the pig receiving end of the pipeline, a control unit of the subsea valve actuation system selectively, autonomously actuating the at least one variable control valve to change the flow rate of fluid flowing through the pipeline during dewatering of the pipeline.

7. The method of claim 6 wherein it is desired to maintain a particular fluid flow rate in the pipeline during dewatering, further including pre-programming the control unit to maintain the particular fluid flow rate in the pipeline during dewatering of the pipeline, the at least one flow meter emitting multiple signals relating to the fluid flow rate in the fluid flow conduit in real time during dewatering of the pipeline, and based at least partially upon at least some of the signals emitted by at least one of the flow meters and without the involvement of an external source at the surface, or a UV, at the pig receiving end of the pipeline, the control unit selectively, autonomously, repeatedly changing the flow rate of fluid in the fluid flow conduit to maintain the particular fluid flow rate in the pipeline during dewatering.

8. The method of claim 6 further including dewatering of the pipeline, the subsea valve actuation system remotely, selectively, autonomously analyzing one or more samples of fluid exiting the subsea pipeline at the pig receiving end of the pipeline without the involvement of an external source at the surface, or a UV, at the pig receiving end of the pipeline.

9. The method of claim 8 further including the control unit receiving data about one or more of the samples of fluid analyzed during dewatering and transmitting such data to at least one desired recipient on a real-time basis.

10. The method of claim 6 further including the control unit detecting the completion of dewatering of the pipeline without the involvement of an external source at the surface, or a UV, at the pig receiving end of the pipeline, and once the control unit has detected the completion of dewatering, the control unit, without the involvement of an external source at the surface, or a UV, at the pig receiving end of the pipeline, selectively, autonomously closing the at least one variable control valve to fluidly isolate the subsea pipeline filled with fluid provided during dewatering of the pipeline.

\* \* \* \* \*